June 2, 1964  L. A. TURNIDGE  3,135,234
DEVICE FOR CONTROLLING ENGINE AND TRANSMISSION
Filed July 30, 1962  3 Sheets-Sheet 1
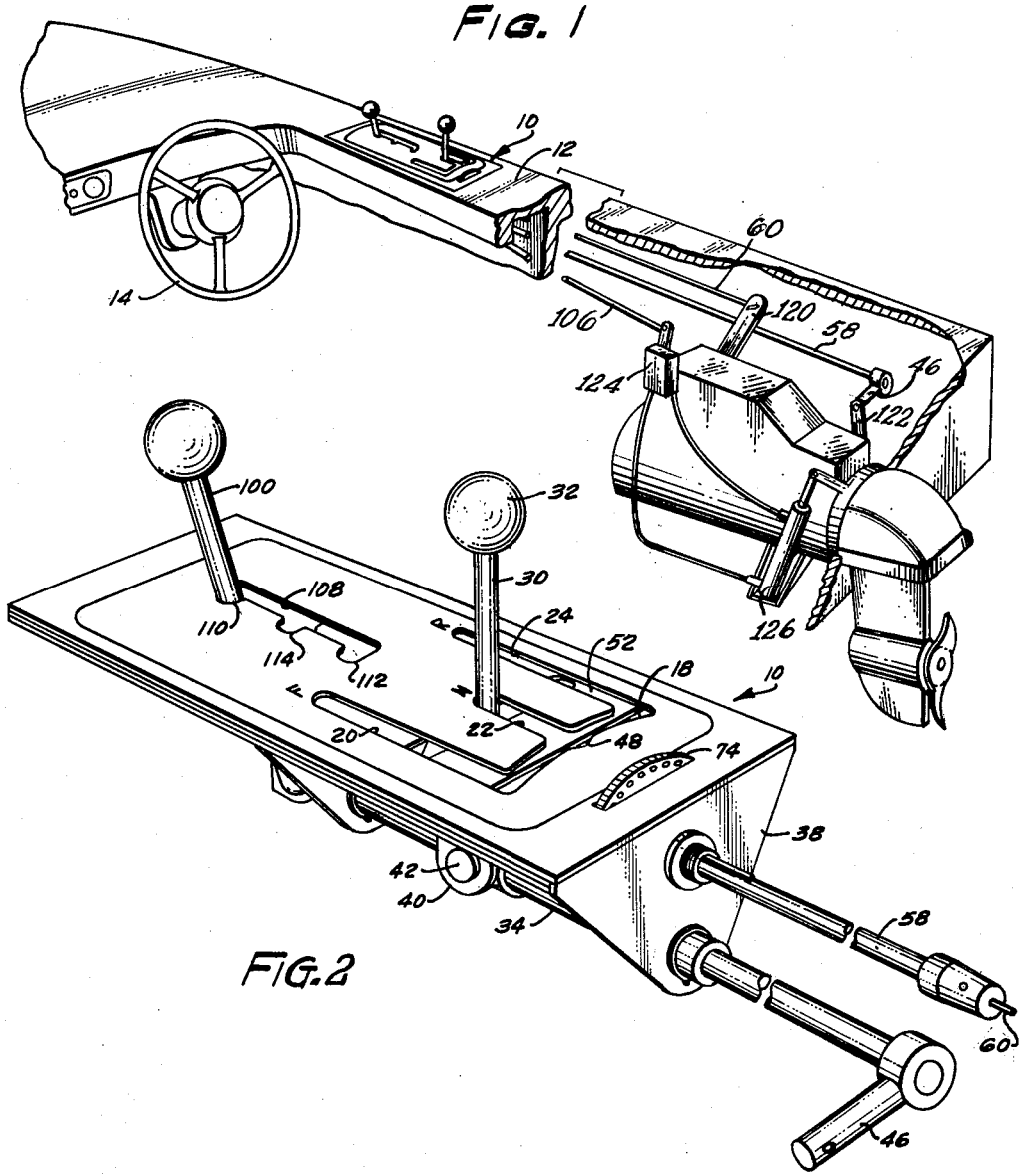
INVENTOR
LESLIE A. TURNIDGE
BY
BUCKHORN, CHEATHAM & BLORE
ATTORNEYS June 2, 1964 — L. A. TURNIDGE — 3,135,234
DEVICE FOR CONTROLLING ENGINE AND TRANSMISSION
Filed July 30, 1962 — 3 Sheets-Sheet 2
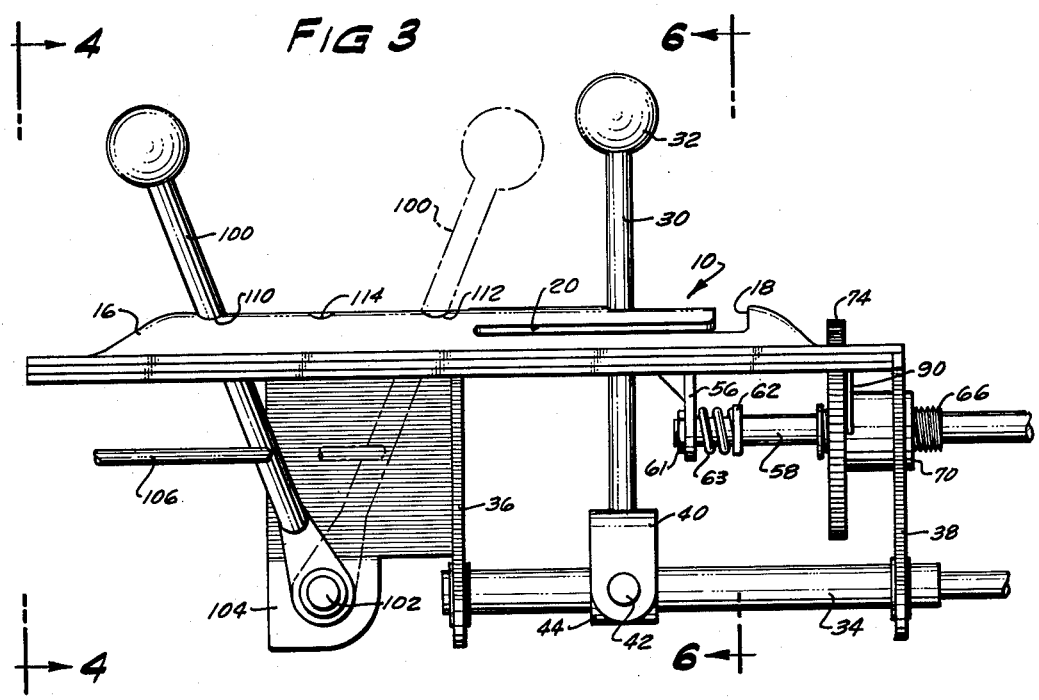
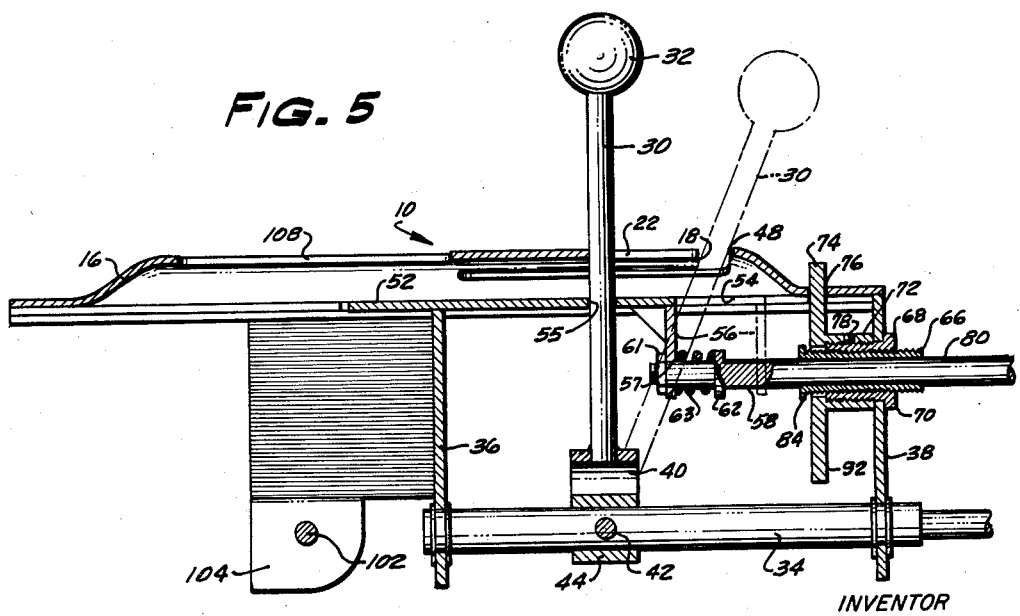
INVENTOR
LESLIE A. TURNIDGE
BY
BUCKHORN, CHEATHAM & BLORE
ATTORNEYS

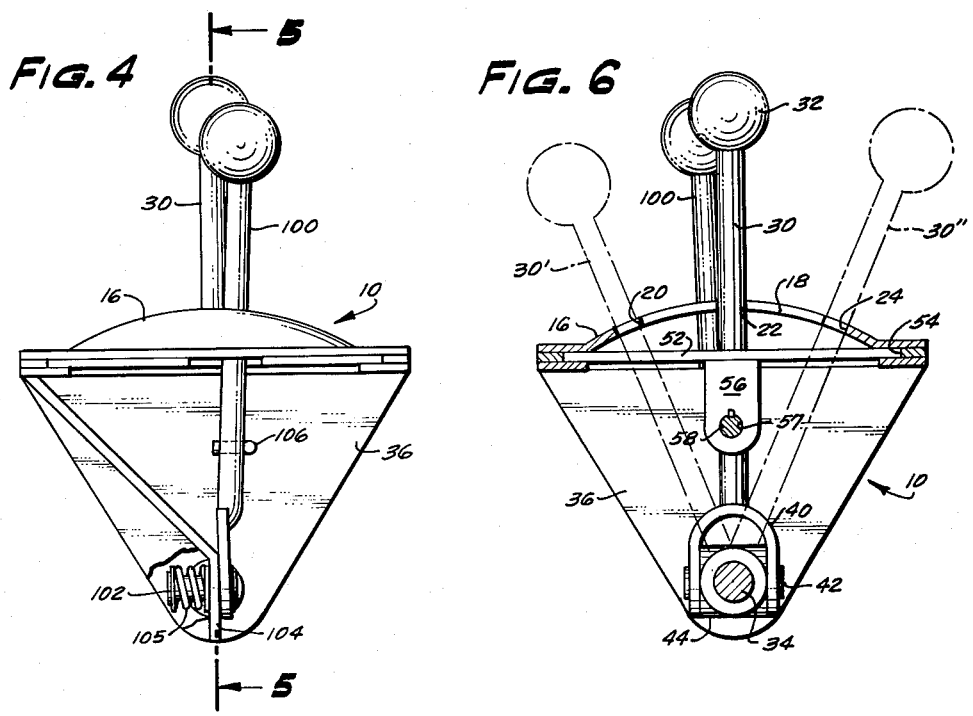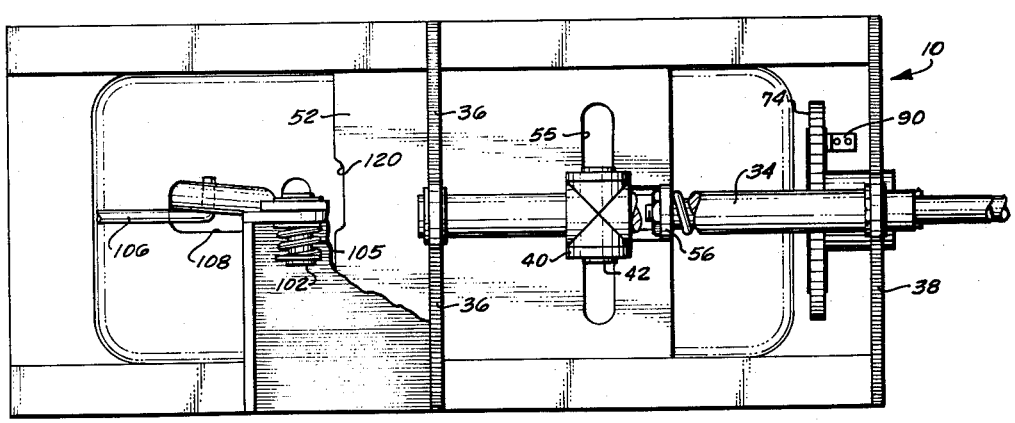

United States Patent Office 3,135,234
Patented June 2, 1964

3,135,234
DEVICE FOR CONTROLLING ENGINE
AND TRANSMISSION
Leslie A. Turnidge, 735 SE. 111th Ave., Portland, Oreg.
Filed July 30, 1962, Ser. No. 213,191
6 Claims. (Cl. 115—41)

The present invention relates to a throttling and shifting control device for an engine and transmission and more particularly to a control device for use with marine engines.

A principal object of the present invention is to provide a control device having a single handle by which the speed of the engine may be controlled and the shifting of the transmission effected.

More particularly, it is an object of the present invention to provide a control device having a single lever for shifting the transmission and controlling the speed of the engine and in which the shifting movement can be made only when the engine has been throttled back.

A further object is to provide a shifting arrangement whereby by necessity an interval of time must occur between shifting of gears thus enabling and assuring deceleration of the engine prior to reengagement of transmission gears.

Another object of the invention is to provide a device of the character indicated above having adjustable means for determining the idling speed of the engine.

Still another object of the present invention is to provide a control device of the nature indicated for use with inboard-outboard type marine installations and in which elevation of a propeller is controlled so that the propeller cannot be raised from the water except when the engine is idling.

Still other objects and advantages of the invention will become more apparent hereinafter.

In accordance with the illustrated embodiment, the control device of the present invention comprises a housing adapted to be mounted upon the gunwale of a boat. The device includes a top plate through which the control lever for the transmission and throttle extends, the control lever being guided by an E-shaped slot arrangement in the top plate the base of which slot defines the gear shifting movement of the lever. The slot arms extending from the base define the forward, neutral and reverse positions of the lever and the lever is so connected to the lever that advancing the lever in the respective slot advances the speed of the engine.

A propeller tilting lever may also be provided on the device of the invention and means are provided cooperatively arranged between the throttle lever and the tilting lever to prevent tilting of the propeller so as to elevate the propeller above the water level except when the throttle lever is in its engine idling position.

For a more detailed description of the invention reference is made to the following specification and accompanying drawings:

FIG. 1 is a fragmentary perspective view of a boat showing the control device of the invention mounted therein;

FIG. 2 is an enlarged perspective view of the control device of the invention;

FIG. 3 is a side elevation of the device;

FIG. 4 is an end elevation of the device;

FIG. 5 is a sectional view taken substantially along line 5—5 of FIG. 4;

FIG. 6 is a sectional view taken substantially along line 6—6 of FIG. 3; and

FIG. 7 is a view from the bottom of the device, portions being broken away to show details thereof.

Referring now to the drawings, the control device 10 of the invention is shown in FIG. 1 in a typical mounting position on the gunwale 12 of a boat adjacent the steering wheel 14 thereof. It is to be understood that this is purely by way of illustration and that the device can be mounted in other locations. The device of the invention comprises a housing formed of metal or other suitable material and which housing includes a top plate 16 having a transverse transmission shifting slot 18 and three longitudinally extending, parallel speed control slots 20, 22 and 24, which extend forwardly at right angles from the transverse slot 18. Extending upwardly through the slots just mentioned above is a throttling and shifting lever 30 which may be provided with a gripping knob 32 on its upper end. The lever 30 is mounted upon a transmission control shaft 34 which extends parallel to the slots 20, 22 and 24 and is rotatively mounted at its opposite ends in housing flanges 36, 38. The lower end of the lever 30 comprises a yoke 40 which is pivotally secured by means of a pin 42 to a block 44 suitably fixed to the transmission control shaft 34 so that the lever may pivot about the pin 42 for movement forwardly and rearwardly in the engine slots 20, 22 and 24, and so that upon movement of the lever from side to side in the transverse slot 18, the transmission control shaft 34 will be caused to rotate about its axis. As best shown in FIG. 2, the shaft 34 extends rearwardly of the housing flange 38 and is provided at its distal end with a crank arm 46 which provides means by which the shaft can be connected to the transmission of the boat engine to effect shifting of the gears thereof. In the illustrated embodiment it will be assumed that when the lever 30 is aligned with the slot 20 (as shown in dotted lines at 30' in FIG. 6) the transmission is in the forward drive position, when aligned with the slot 22 (as shown in solid lines in FIG. 6) it is in the neutral position, and when aligned with the slot 24 (as shown in dotted lines at 30" in FIG. 6) it is in the reverse position. A notch 48 may be provided in the back edge of the transverse slot 18 opposite the neutral slot 22 to indicate the neutral position of the lever to the operator when he is not able to watch his movements of the lever 30.

Mounted beneath the top plate 16 is a throttle plate 52 the opposite edges of which are slidably engaged in channels 54 as best shown in FIGS. 4 and 6 so that the throttle plate may slide in a direction parallel to the engine speed slots 20, 22 and 24. The throttle plate 52 is formed with a cross slot 55 of slightly greater width than the lever 30 and through which slot the lever extends. The slot 55 is of such length that the lever 30 may be moved freely the full length of the slot 18 of the top plate. It will be apparent that movement of the lever 30 forwardly and rearwardly in the engine speed slots 20, 22 and 24 will cause corresponding movement of the throttle plate 52.

Extending downwardly from the throttle plate 52 is a flange 56 having an opening 57 through which slidably extends a rod 58 adapted to be connected to the throttle cable 60 of the boat engine, as is indicated in FIG. 2. The end of the rod 58 extending through the flange 56 is threaded to receive a nut 61. The rod 58 is provided with a collar 62 spaced from the flange 56 and between which is mounted a compression spring 63 through which force may be transmitted to move the rod 58.

Referring more particularly now to FIG. 5, the rod 58 is slidably received in a bushing 66 formed with threads on its exterior surface, the bushing being threaded into a cooperatively threaded adjusting sleeve 68, having a collar 70 engaging the outer surface of the flange 38. The sleeve 68 is engaged within the threaded sleeve 72 of an adjusting knob 74 which extends upwardly through a slot 76 in the top plate 16. A set screw 78 or other suitable means is provided to lock the sleeves 68, 72 together. The sleeve 66 and rod 58 are engaged by a key 80, thus to prevent rotation of the sleeve 66 upon turning to the knob 74. As will be apparent, rotation of the adjusting knob 74 will cause the bushing 66 to move longitudinally with respect to its position relative to the flange 38.

The bushing 66 extends beyond the knob 74 and is adapted to provide an adjustable stop to engage the collar 62 when the lever 30 is moved towards gear-shifting position to arrest further movement of the rod 58. By adjusting the position of the bushing the idling speed of the motor can be adjusted. That is, if it is desired to have the engine idle at a slightly advanced speed the knob 74 can be adjusted to extend the bushing toward the flange 56 so that the collar 62 will engage the bushing 66 prior to the time the lever 30 is moved back to the transverse slot 18. However, the spring 63 will compress under manual pressure on the lever 30 so that the flange 56 may slide on the rod 58 to enable the lever to be moved into the transfer slot 18 when it is desired to shift the transmission. To prevent accidental rotation of the adjusting mechanism, a spring 90 may be provided to cooperate with detents 92 (see FIG. 5) in the adjusting knob 74.

It will be apparent that a substantial time interval is required to move the lever 30 from a forward position in any of the slots 20, 22 and 24 to slot 18 and thence to one of the other slots whereby the engine controlled by the device will be able to decelerate during this shifting movement so that the transmission may be reengaged without difficulty or damage.

Means are also provided on the device of the invention to control elevation of a propeller in an inboard-outboard type arrangement. As is well known, in such arrangements provision is made to enable the propeller to be elevated partially from its full operative depth when the boat is to traverse a shallow depth or to be elevated entirely out of the water, for service or repair. It is, of course, not desirable that a propeller be elevated from the water with the engine under full throttle, and it is desirable also to maintain the boat under only about half throttle when the propeller is only at its partial depth. In accordance with the illustrated embodiment, the device 10 is provided with an engine-tilting lever 100 mounted on a pivot pin 102 extending through a housing flange 104 for pivotal movement in a direction parallel to the slots 20, 22 and 24. A biasing spring 105 arranged in conventional manner between the pin 102 and flange 104 is preferably provided to urge the lever against the flange 104 whereby the frictional engagement therebetween will tend to hold the lever in position. The lever 100 is connected through suitable means indicated at 106 to the propeller-elevating mechanism, and which may be of any conventional type, and need not be illustrated herein. The lever 100 extends upwardly through a slot 108 in the top plate 16, which slot extends parallel to the slots 20, 22 and 24. The lever 100 is adapted to be connected to the propeller-elevating mechanism so that in the forward position of the lever as shown in FIG. 3 the propeller is in its fully lowered position and in the rearmost position of the lever as indicated in dotted lines in FIG. 3 the propeller is in its fully elevated position. Notches 110, 112 may be provided in the side wall of the slot 108 to retain the lever 100 in the respective positions mentioned above. A further notch 114 may be provided at the midpoint of the slot 108 at the position in which the lever 100 will raise the propeller to semi-elevated position.

Means are operatively arranged between the tilting lever 100 and the throttling lever 30 to prevent rearward movement of the tilting lever when the throttling lever is in the forward position thereof. As best shown in FIG. 7 the forward edge of the throttle plate 52 is formed with a notch 120 and the length of the throttle plate 52 is such that the notch 120 is positioned to engaged the lever 100 when the latter is at the forward end of the slot 108, and the lever 30 is in the full forward position in either the forward or the reverse speed slots, 20 and 24, respectively. Accordingly, when the throttle lever 30 is in such positions, the propeller is in its lowered position and cannot be elevated without first moving the throttle plate 52 rearwardly, which of course, will cause throttling of the engine. Similarly, when the propeller-tilting lever 100 is in the intermediate position in the notch 114, and the propeller is in a semi-elevated position, the engine will be throttled back to half speed and cannot be advanced back to full speed. Only when the throttle is moved to the idling position can the propeller be raised from the water. Obviously, the propeller-tilting arrangement can be omitted from the speed device without affecting the operation of the remainder of the apparatus.

A typical connection of the control device to a motor and propeller assembly is indicated in FIG. 1. As shown, the throttle cable 60 is connected to an operating lever 120 of an engine carburetor while the crank arm 46 is connected to an operating lever 122 of a transmission. The control rod 106 of the propeller tilting mechanism is shown connected to the control valve 124 of an hydraulic cylinder 126 which is connected to effect tilting of a propeller in the conventional manner.

Having described and illustrated a preferred embodiment of the invention, it should be apparent to those skilled in the art that the invention permits of modification in arrangement and detail. I claim as my invention all such modifications as come within the true spirit and scope of the appended claims.

I claim:

1. A throttling and shifting control for an engine and connected transmission comprising a housing having a top plate formed with a transverse slot and a pair of elongate, parallel slots extending from said transverse slot at right angles thereto, a throttling and shifting lever, a transmission control shaft mounted in said housing beneath said top plate in spaced relation thereto and axially parallel to said parallel slots for rotation about its axis, means mounting said lever to said shaft whereby said shaft may be rotated about its axis with said lever and said lever may be pivoted axially of said shaft about its mounting thereof, said lever extending upwardly through said slots whereby movement of said lever in said transverse slot from one end to the other may effect rotation of said transmission control shaft and shifting of said transmission, a throttle plate mounted in said housing beneath said top plate and above said shaft for sliding movement in a direction parallel to said parallel slots, said throttle plate having a cross slot therein of a width only slightly greater than said lever and parallel to said transverse slot whereby said plate is moved forwardly or rearwardly corresponding to the movement of said lever in said parallel slots, said lever extending through said cross slot, and means for connecting said throttle plate to said engine whereby upon positioning of said lever in said transverse slot the speed of said engine is retarded and when said lever is advanced in any one of said parallel slots the speed of said engine is advanced.

2. A throttling and shifting control for an engine and connected transmission comprising a housing having an elongate top plate formed with a transverse slot and three longitudinally extending, parallel slots extending from said transverse slot, a transmission control shaft mounted in said housing beneath said top plate in spaced relation thereto and axially parallel to said three slots for rotation about its axes, a throttling and shifting lever, means mounting said lever to said shaft whereby said shaft may be rotated about its axis with said lever, said mounting means permitting pivoting of said lever in the direction of said shaft axis about said mounting means, said lever extending upwardly through said slots whereby movement of said lever in said transverse slot may effect rotation of said transmission control shaft and shifting of said transmission, said parallel slots defining forward, neutral and reverse positions of said transmission, a throttle plate mounted in said housing beneath said top plate and above said shaft for sliding movement in a direction parallel to said three slots, said throttle plate having a cross slot therein of a width only slightly greater than said lever and parallel to said transverse slot, whereby said plate is moved forwardly or rearwardly corresponding to the movement of said lever in said parallel slots, said lever extending through said cross slot, and means for connecting said throttle plate to the throttle of said engine whereby upon positioning of said lever in said transverse slot the speed of said engine is retarded and when said lever is advanced in any one of said three slots the speed of said engine is advanced.

3. A throttling and shifting control for an engine and connected transmission comprising a housing having a top plate formed with a transverse slot and a pair of elongate, parallel slots extending from said transverse slot at right angles thereto, a throttling and shifting lever, a transmission control shaft mounted in said housing beneath said top plate in spaced relation thereto and axially parallel to said parallel slots for rotation about its axis, means mounting said lever to said shaft whereby said shaft may be rotated about its axis with said lever and said lever may be pivoted axially of said shaft about its mounting thereon, said lever extending upwardly through said slots whereby movement of said lever in said transverse slot from one end to the other may effect rotation of said transmission control shaft and shifting of said transmission, a throttle plate mounted in said housing beneath said top plate and above said shaft for sliding movement in a direction parallel to said parallel slots, said throttle plate having a cross slot therein of a width only slightly greater than said lever and parallel to said transverse slot whereby said plate is moved forwardly or rearwardly corresponding to the movement of said lever extending through said cross slot, means for connecting said throttle plate to said engine whereby upon positioning of said lever in said transverse slot the speed of said engine is retarded and when said lever is advanced in any one of said parallel slots the speed of said engine is advanced, and means operatively arranged with said lever defining an adjustable stop means in the path of the rearward speed retarding movement of said lever, said stop means including a resilient portion operatively engaged by said lever upon movement of said lever toward said rearward position and capable of yielding under manual pressure applied to said lever and of returning to its normal position upon release of said manual pressure.

4. A throttling and shifting control for an engine and connected transmission comprising a housing having a top plate formed with a transverse slot and a pair of elongate, parallel slots extending from said transverse slot at right angles thereto, a throttling and shifting lever, a transmission control shaft mounted in said housing beneath said top plate in spaced relation thereto and axially parallel to said parallel slots for rotation about its axis, means mounting said lever to said shaft whereby said shaft may be rotated about its axis with said lever and said lever may be pivoted axially of said shaft about its mounting thereon, said lever extending upwardly through said slots whereby movement of said lever in said transverse slot from one end to the other may effect rotation of said transmission control shaft and shifting of said transmission, a throttle plate mounted in said housing beneath said top plate and above said shaft for sliding movement in a direction parallel to said parallel slots, said throttle plate having a cross slot therein of a width only slightly greater than said lever and parallel to said transverse slot whereby said plate is moved forwardly or rearwardly corresponding to the movement of said lever extending through said cross slot, means for connecting said throttle plate to said engine whereby upon positioning of said lever in said transverse slot the speed of said engine is retarded and when said lever is advanced in any one of said slots the speed of said engine is advanced, said throttle plate having a depending flange, means defining an adjustable stop including a compression spring engageable by said flange upon movement of said lever toward said transverse slot, and means for adjusting the position of said stop and spring in the direction of travel of said flange.

5. A control device for a boat having an engine connected through a transmission to a tilting propeller, said device comprising:

a housing including a top plate formed with a transverse transmission shifting slot and at least one engine speed control slot extending longitudinally from said transverse slot, a transmission control shaft mounted in said housing in axially parallel relation to said engine speed slot, said shaft being rotatable about its axis, a throttling and shifting lever connected to said shaft for effecting rotation thereof, said lever extending upwardly through said upper plate slots, said shaft being adapted to be connected to said transmission whereby rotation of said shaft by movement of said lever in said transverse slot effects shifting of said transmission, a throttle plate mounted in said housing for movement in a direction parallel to said engine speed slot, said throttle plate having a cross slot therein receiving said lever so that movement of said lever forwardly or rearwardly in said top plate engine speed slot effects corresponding movement of said throttle plate, said throttle plate being adapted to be connected to said engine so that when said lever is in said cross slot the speed of said engine is retarded and when said throttle is advanced in said engine speed slot said engine speed is advanced, a propeller-tilting lever mounted on said housing forwardly of said throttling and shifting lever for pivotal movement in a direction parallel to said engine speed slot, said tilting lever being adapted to be connected to said propeller so that the latter is in its lowered, water immersed position in the forward position of said tilting lever and in its raised, above water position in the rearward position of said tilting lever, and means on said tilting lever and said throttle plate adapted to engage and prevent rearward movement of said tilting lever except when said throttle plate is in the rearward, engine speed retarding position thereof.

6. A control device for a boat having an engine connected to a tilting propeller, said device comprising:

a housing including a top plate formed with at least one engine speed control slot having a forward and a rearward end, a throttling lever extending through said slot and being mounted for longitudinal movement in said slot, said lever being adapted to be connected to said engine so that when said lever is at said rearward end of said slot the speed of said engine is retarded and as said lever is advanced toward said forward end of said slot the speed of said engine is advanced, a propeller-tilting lever mounted on said housing for pivotal movement in a direction parallel to said engine speed control slot, said tilting lever being adapted to be connected to said propeller so that the latter is in its lowered, water immersed position in the forward position of said tilting lever and is in its raised above water position in the rearward position of said tilting lever, and means operatively arranged between said tilting lever and said throttling lever to prevent movement of said tilting lever to said rearward position, except when said throttling lever is in the rearward, engine speed retarding position thereof, whereby said propeller cannot be elevated out of the water except when the engine is idling.

References Cited in the file of this patent

UNITED STATES PATENTS

| | | |
|---|---|---|
| 2,482,274 | Hewitt et al. | Sept. 20, 1949 |
| 2,540,427 | Charles et al. | Feb. 6, 1951 |
| 2,752,875 | Hills | July 3, 1956 |
| 2,967,436 | Steinlein | Jan. 10, 1961 |